(12) United States Patent
Elter

(10) Patent No.: US 9,321,459 B2
(45) Date of Patent: Apr. 26, 2016

(54) TEMPORARY COMPENSATION OF UNDESIRED DECELERATION DUE TO BRAKING INTERVENTIONS BY ESP FUNCTIONS

(75) Inventor: Stephan Elter, Weinsberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 64 days.

(21) Appl. No.: 14/241,557

(22) PCT Filed: Aug. 8, 2012

(86) PCT No.: PCT/EP2012/065533
§ 371 (c)(1),
(2), (4) Date: Sep. 3, 2014

(87) PCT Pub. No.: WO2013/029947
PCT Pub. Date: Mar. 7, 2013

(65) Prior Publication Data
US 2015/0032354 A1    Jan. 29, 2015

(30) Foreign Application Priority Data

Sep. 2, 2011  (DE) .......................... 10 2011 082 034

(51) Int. Cl.
*B60W 30/02* (2012.01)
*B60W 30/045* (2012.01)
(Continued)

(52) U.S. Cl.
CPC ............ *B60W 30/02* (2013.01); *B60T 8/17555* (2013.01); *B60W 10/04* (2013.01);
(Continued)

(58) Field of Classification Search
CPC ........ B60T 8/1755–8/17558; B60T 2270/303; B60W 30/045; B60W 30/02; B60W 30/025; Y10T 477/87

USPC ........................................................... 701/99
See application file for complete search history.

(56) References Cited

U.S. PATENT DOCUMENTS 6,304,805 B1 *  10/2001  Onogi ............................. 701/36
6,953,230 B2 *  10/2005  Einig et al. ..................... 303/146

(Continued)

FOREIGN PATENT DOCUMENTS

| DE | 19963747 A1 * | 7/2001 | ............. B60K 41/20 |
| DE | 10 2009 026813 | 12/2010 | |

(Continued)

OTHER PUBLICATIONS

International Search Report for PCT/EP2012/065533 dated Nov. 2, 2012.

*Primary Examiner* — Behrang Badii
*Assistant Examiner* — David Testardi
(74) *Attorney, Agent, or Firm* — Kenyon & Kenyon LLP

(57) ABSTRACT

A method for compensating for the change in longitudinal dynamics variables in a motor vehicle brought about by a braking intervention of an electronic stability program (ESP) includes: identifying the change in longitudinal dynamics variables; defining a filter to filter the identified value of the change in longitudinal dynamics variables; filtering the identified value of the change using the defined filter, in order to obtain a filtered value; identifying the difference between the identified raw value and the filtered value of the change in longitudinal dynamics variables; modifying the engine torque that is requested by the driver and is acting on the drive wheels of the motor vehicle, by an amount equal to the identified difference value, in order to obtain a compensating engine torque.

8 Claims, 3 Drawing Sheets

(51) Int. Cl.
  *B60T 8/1755* (2006.01)
  *B60W 10/04* (2006.01)
  *B60W 10/18* (2012.01)
  *B60W 30/18* (2012.01)

(52) U.S. Cl.
  CPC ............ *B60W 10/18* (2013.01); *B60W 30/045* (2013.01); *B60W 30/18009* (2013.01); *B60T 2220/02* (2013.01); *B60T 2270/303* (2013.01)

(56) References Cited

U.S. PATENT DOCUMENTS

| | | | |
|---|---|---|---|
| 7,318,629 B1 * | 1/2008 | Sun et al. | 303/146 |
| 7,379,808 B2 * | 5/2008 | Pfeiffer et al. | 701/93 |
| 7,566,103 B2 * | 7/2009 | Wanner et al. | 303/155 |
| 8,437,914 B2 * | 5/2013 | Yu et al. | 701/41 |
| 8,818,667 B2 * | 8/2014 | van Vliet | 701/69 |
| 9,020,699 B2 * | 4/2015 | Schafiyha et al. | 701/41 |
| 2004/0199300 A1 * | 10/2004 | Gustafsson et al. | 701/1 |
| 2005/0107938 A1 * | 5/2005 | Wetzel et al. | 701/70 |
| 2005/0216164 A1 * | 9/2005 | Sakata | 701/70 |
| 2009/0051216 A1 * | 2/2009 | Maeda et al. | 303/146 |
| 2010/0056338 A1 * | 3/2010 | Erban | 477/203 |

FOREIGN PATENT DOCUMENTS

| | | | | |
|---|---|---|---|---|
| JP | 09039759 A | * | 2/1997 | B60T 8/24 |
| JP | 2004210151 A | * | 7/2004 | B60K 41/20 |
| JP | 2009184575 A | * | 8/2009 | |
| JP | 2009227043 A | * | 10/2009 | |
| WO | WO 9907588 A1 | * | 2/1999 | B60T 8/00 |
| WO | WO 2010/142496 A1 | * | 12/2010 | |
| WO | WO 2011/083004 | | 7/2011 | |

* cited by examiner

TEMPORARY COMPENSATION OF UNDESIRED DECELERATION DUE TO BRAKING INTERVENTIONS BY ESP FUNCTIONS

BACKGROUND OF THE INVENTION

1. Field of the Invention

The present invention relates to a method and an apparatus for temporarily compensating for the change in longitudinal dynamics variables in a motor vehicle brought about by a braking intervention of an electronic stability program (ESP).

2. Description of the Related Art

In modern motor vehicles, electronic stability programs (ESPs) nowadays serve in many ways to increase the driving stability of the vehicle and thereby, as a driver assistance system, make an active contribution to driving safety. By targeted braking of individual wheels, ESP systems counteract vehicle skidding in critical driving situations so as thereby to ensure that the driver has control of the vehicle. Both oversteering and understeering of the motor vehicle are prevented by targeted braking of individual wheels.

In order to identify a critical driving situation, the ESP system continuously compares the driver's input with the operating state of the motor vehicle. In this context, steering angle sensors supply information regarding the steering direction desired by the driver, the engine management system supplies information regarding the engine torque requested by the driver, and wheel rotation speed sensors of the antilock braking system and yaw rate sensors supply information regarding the actual driving behavior of the motor vehicle. If a sufficient discrepancy is ascertained between the identified operating state of the motor vehicle and the driver's input, the ESP system intervenes as an assistance system. Oversteering of the motor vehicle, for example, is corrected by braking the front wheel on the outside of the curve, and understeering, for example, by braking the rear wheel on the inside of the curve. Provision can moreover be made that the ESP system also influences engine management, and decreases the engine power output in critical driving situations in order to prevent the drive wheels from spinning.

Especially when the motor vehicle is being driven in a "sport" mode, however, it can be desirable for the motor vehicle to exhibit elevated dynamics. Provision can be made for this purpose for the ESP system to generate a yaw torque in order to make the motor vehicle more agile and in order to prevent understeering. For this, the system brakes wheels on the inside of the curve, thereby producing the desired yaw torque turning into the curve. An intervention of this kind is intended, however, not to be perceptible as such by the driver of the motor vehicle. Braking of the wheels, however, produces not only the desired yaw torque but also a longitudinal deceleration of the vehicle that the driver feels in some circumstances. To prevent this, provision can be made to compensate for a longitudinal deceleration of the motor vehicle, which occurs as a result of a yaw torque braking intervention of the ESP system, by an elevation of the engine torque above the driver's specification by an amount equal to the braking torque. As a result, no perceptible longitudinal deceleration occurs.

For safety reasons, however, the elevation can be permitted only in a few driving situations and even then only in part. The compensation is therefore carried out using, for example, at most 70% of the braking torque and only when drive power is being applied.

BRIEF SUMMARY OF THE INVENTION

The present invention proposes a method for temporarily compensating for the change in longitudinal dynamics variables in a motor vehicle brought about by a braking intervention of an electronic stability program (ESP), having the method steps of:
  identifying the change in longitudinal dynamics variables brought about by the braking intervention;
  defining a filter to filter the identified value of the change in longitudinal dynamics variables;
  filtering the identified value of the change in longitudinal dynamics variables using the defined filter, in order to obtain a filtered value of the change in longitudinal dynamics variables;
  identifying the difference between the identified raw value of the change in longitudinal dynamics variables and the filtered value of the change in longitudinal dynamics variables;
  modifying the engine torque that is requested by the driver of the motor vehicle and is acting on the drive wheels of the motor vehicle, as a function of the identified difference value, in order to obtain a compensating engine torque.

The method according to the present invention reduces the risk that the vehicle may independently accelerate. Compensation for the change in longitudinal dynamics occurring as a result of an ESP braking intervention is thus possible even when drive power is not being applied. Only the change in the longitudinal dynamics is compensated for by the method according to the present invention. The static braking torque, conversely, remains unchanged.

A "change in longitudinal dynamics" is to be understood for purposes of the invention as a change in longitudinal force and/or a longitudinal deceleration. "Longitudinal dynamics" thus hereinafter represents the terms "change in longitudinal force" and "longitudinal deceleration."

In an embodiment of the method according to the present invention, the change in the engine torque that is requested by the driver of the motor vehicle and is acting on the drive wheels of the motor vehicle in order to obtain a compensating engine torque is made by an amount equal to the identified difference value between the raw value and filtered value of the change in longitudinal dynamics variables.

In order to identify the change in longitudinal dynamics variables brought about by the ESP-related braking intervention it is possible to utilize, for example, information already present in the ESP system regarding vehicle dynamics, for example steering angle, wheel rotation speed, and yaw rate.

It has become apparent, surprisingly, that continuous complete compensation for the change in longitudinal dynamics variables caused by the braking torque is not necessary, since the driver perceives principally the change in longitudinal dynamics variables. The method according to the present invention allows an appreciable reduction in the perceptibility of the change in longitudinal dynamics variables occurring as a result of the braking torque. The filtered value of the change in longitudinal dynamics variables that is obtained is the target value or reference value of the maximum change in longitudinal dynamics variables that is perceptible by the driver. This ensures at the same time that, especially including when drive power is not being applied, an undesired acceleration of the motor vehicle over the time of the intervention is prevented. The method according to the present invention compensates only for a change in longitudinal force. The static braking force, conversely, remains unchanged.

By way of the method according to the present invention, the change in longitudinal force as a result of the braking intervention of the ESP is distributed over a longer time period, with the result that perceptibility is reduced. A damping of the change in longitudinal dynamics variables thus occurs. According to the present invention, for this purpose the engine torque is modified only temporarily in suitable fashion with respect to the driver specification.

Because a reduction in the vehicle's speed by the ESP is desired in a context of large brake intervention torques over a longer period of time, provision can be made according to the present invention to evaluate the magnitude of the driver specification in terms of engine torque, and/or a change in that driver specification, over the time period of the intervention.

For example, if the driver of the motor vehicle increases the engine torque at the point in time of the intervention, or if the engine torque specified by the driver is already very high, a slower reduction in the engine torque elevated according to the present invention is advisable, since the resulting dynamics of the motor vehicles appears to be what the driver intends. Conversely, if the driver of the motor vehicle reduces the engine torque at the point in time of the intervention, a reduction in the elevated engine torque can occur more quickly, since the driver is deliberately bringing about a corresponding change in longitudinal dynamics variables. Provision can thus be made, in an embodiment of the invention, for an adjustment of the effective engine torque to the driver's input to occur, after cancellation of the change in engine torque according to the present invention, in consideration of a gradient of the driver's input over the time of the intervention.

In a further embodiment of the invention, provision can be made to estimate the probability and/or magnitude of an imminent elevation of the engine torque in order to compensate for a change in longitudinal dynamics variables. Provision can be made, for example, to lower the engine torque below the driver's specification as a function of the estimated imminent intervention by an amount equal to a defined torque, or to cancel it later. As a result it is not necessary, at the time of the intervention, to elevate the engine torque above the driver's specification. In such a case, with previous lowering in order to compensate for the change in longitudinal dynamics variables occurring as a result of the braking intervention, an elevation can be raised back up to the driver's specification. In order to estimate the probability and/or magnitude of an imminent intervention, consideration can be given not only to data regarding vehicle dynamics such as those considered in the ESP system, but also, for example, to other data of the engine management system.

In a further embodiment of the invention, provision can be made that a dynamic adaptation of the compensation is provided for. In other words, for example, if the brake intervention torque is very high because a corresponding intervention is urgently necessary, less of a change in longitudinal dynamics variables is compensated for, or filtering back to the driver's specification occurs more quickly. This can go so far as in fact to lower the engine torque below the driver's specification.

In an embodiment of the method according to the present invention, provision is made that the filter is defined as a function of the engine torque requested by the driver at the point in time that braking is effective. The result is to make possible an adaptation, as described above, of the compensation.

In a further embodiment of the invention, provision is made that the filter is a low-pass filter. This represents a simple way of identifying the dynamic braking torque that is to be compensated for by the elevation in engine torque.

In a further embodiment of the invention, the threshold value of the filter is defined as a function of the engine torque requested by the driver at the point in time that braking is effective. This, too, allows dynamic adaptation of the intervention according to the present invention to the driver's input. The threshold value of the filter here represents the point below which the raw value of the change in longitudinal dynamics variables is subjected to the filter.

According to a further embodiment of the invention, an adaptation of the filter and/or of the threshold value occurs, upon a change in the engine torque requested by the driver of the motor vehicle, at the point in time of compensation, in order to obtain a compensating engine torque adapted in the direction of the change in engine torque desired by the driver.

In an embodiment of the invention, provision can furthermore be made that the compensating engine torque is identified in consideration of the gear ratio present at the point in time of compensation. Improved adaptation of the compensating torque to the driving situation can thereby occur.

The present invention further [?proposes] an apparatus for compensating for the change in longitudinal dynamics variables in a motor vehicle brought about by a braking intervention of an electronic stability program (ESP), having a device for identifying the change in longitudinal dynamics variables brought about by the braking intervention, a device for defining a filter for filtering the identified value of the change in longitudinal dynamics variables, a device for identifying a filtered value of the change in longitudinal dynamics variables using the defined filter, a device for identifying the difference between the identified raw value of the change in longitudinal dynamics variables and the filtered value of the change in longitudinal dynamics variables, and a device for making available a compensating engine torque, the devices being connected to one another in terms of signal technology in such a way that the change in longitudinal dynamics variables brought about by a braking intervention of an electronic stability program (ESP) can be compensated for at least in part by the compensating engine torque.

In an embodiment of the apparatus according to the present invention, provision can be made in this context that it is a constituent of an ESP system in a motor vehicle. Integration of an apparatus according to the present invention into an ESP system allows utilization of the data and values of the sensors provided in the motor vehicle, and already accumulating in the ESP system, for identification according to the present invention of a compensating engine torque. This makes possible simple integration of the method according to the present invention into the electronic control system of a motor vehicle.

According to a further embodiment of the apparatus according to the present invention, the filter encompasses a low-pass filter, a slope limiter, and/or a ramp.

In an embodiment of the apparatus, provision can further be made for the device for identifying the change in longitudinal dynamics variables brought about by the braking intervention to encompass an acceleration sensor. The latter can in particular be suitable for avoiding incorrect acceleration of the vehicle.

DETAILED DESCRIPTION OF THE INVENTION

Figure 1:
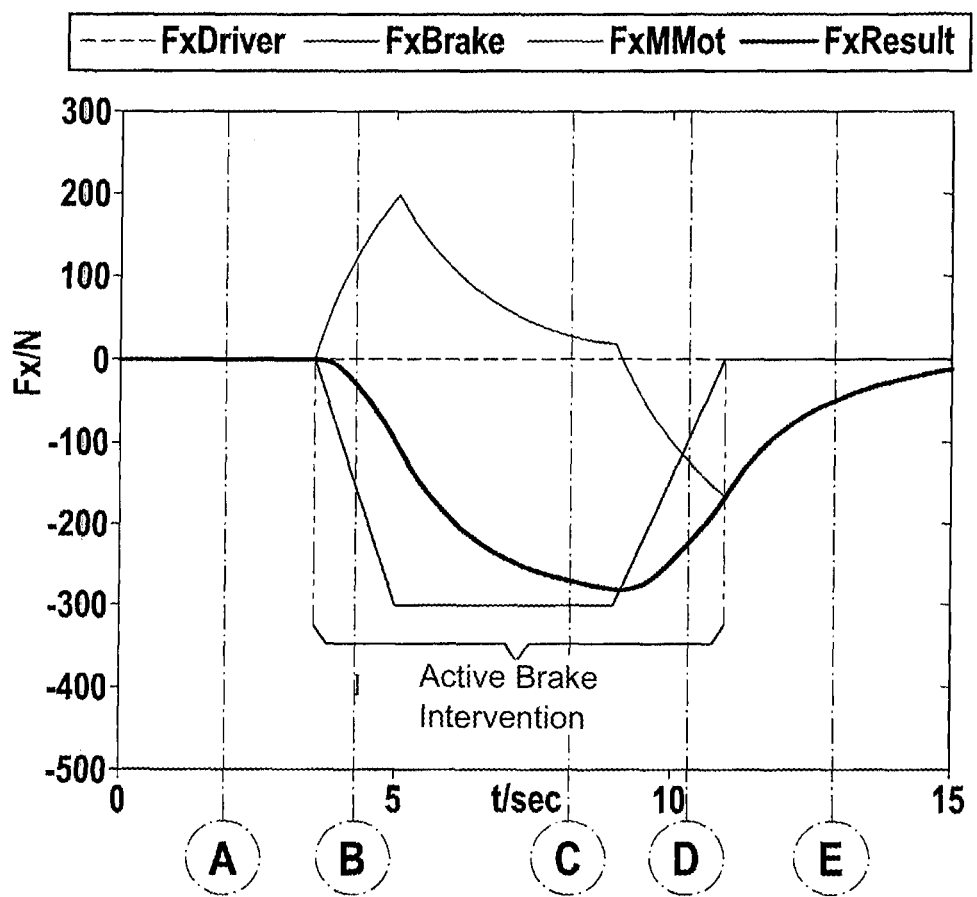
FIG. 1 is a torque diagram of the longitudinal forces occurring in the motor vehicle.

FIG. 1 is a torque diagram of the longitudinal dynamics or longitudinal force occurring in the vehicle. FxDriver here signifies the longitudinal force resulting from the engine torque in accordance with the driver's input, FxBrake the longitudinal force resulting from the ESP braking intervention without engine torque adaptation, FxMMot the longitudinal force resulting from engine torque adaptation without ESP braking intervention, and FxResult the resulting longitudinal force in a context of ESP braking intervention and engine torque adaptation. (A) indicates the longitudinal force with no intervention and no engine torque adaptation. The longitudinal forces of the driver specification here is a constant 0 N. At (B), the intervention of the method according to the present invention or the apparatus has begun. With no engine torque adaptation, the longitudinal force would abruptly decrease (FxBrake). Thanks to a rapid increase in engine torque beyond the driver specification (FxMMot), the resulting change in longitudinal dynamics variables is greatly damped (FxResult). At (C), there is almost no change in the intensity of the intervention torque. The elevation in engine torque is slowly reduced. The resulting longitudinal force slowly becomes smaller. If necessary, the driver can additionally increase the engine torque specification by pressing the accelerator pedal. If this is the case, the reduction in intervention torque (compensation torque) can occur more slowly. At (D) the intervention torque is reduced quickly. Without engine torque adaptation, the longitudinal force would abruptly rise (FxBrake). Due to a rapid lowering of the engine torque below the driver's specification, the resulting change in longitudinal dynamics variables is greatly damped. At (E) the intervention has ended. The lowering of the engine torque is slowly canceled until the driver's specification is once again reached. If the driver indicates that he or she needs traction (very high driver request or rising driver request), the lowering of the engine torque can be canceled more quickly.

Figure 2:
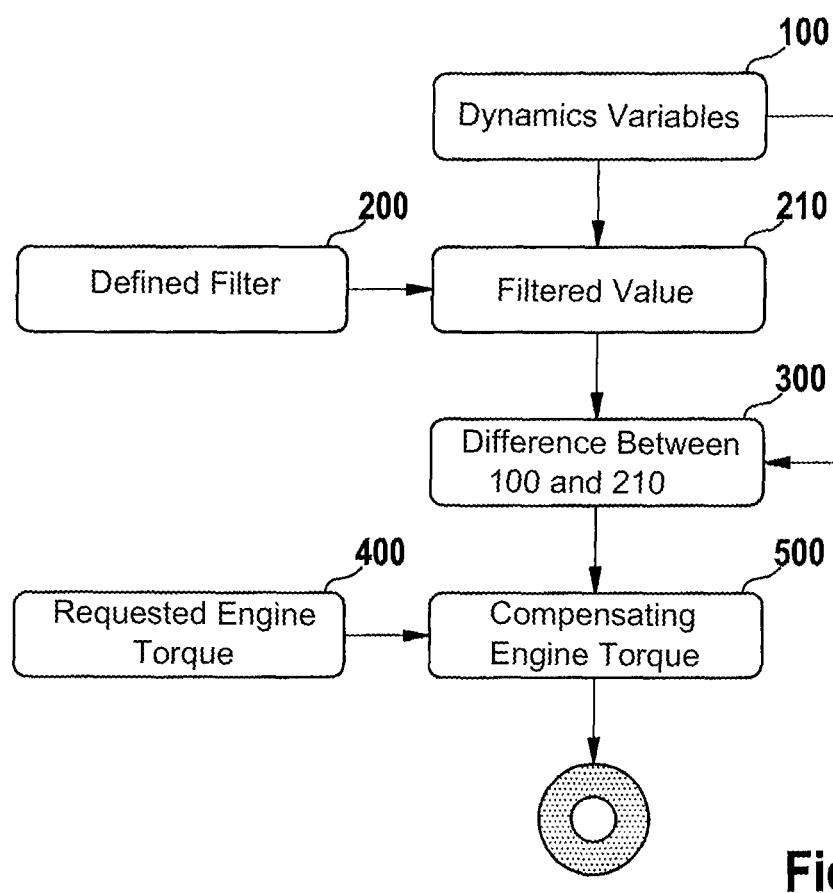
FIG. 2 is a flow chart of a method according to the present invention.

FIG. 2 is a flow chart of a method according to the present invention. The change in longitudinal dynamics variables 100 brought about by the braking intervention is identified. This can be done, for example, on the basis of existing data regarding vehicle dynamics, e.g. steering angle, wheel rotation speed, or yaw rate. A filter 200 for filtering the identified value 100 of the change in longitudinal dynamics variables is then defined. The selection of filter 200 can be dependent on the respective driving situation or also on further factors. The filter can be, in particular, a low-pass filter, a slope limiter, and/or a ramp. The identified value 100 of the change in longitudinal dynamics variables is filtered using the defined filter 200 in order to obtained a filtered value 210 of the change in longitudinal dynamics variables. The difference 300 between the identified raw value 100 of the change in longitudinal dynamics variables and the filtered value 210 of the change in longitudinal dynamics variables is then identified. The identified difference serves to change the engine torque. The engine torque 400 that is requested by the driver of the motor vehicle and is acting on the drive wheels of the motor vehicle is modified by an amount equal to the identified difference value 300 in order to obtain a compensating engine torque 500.

Figure 3:
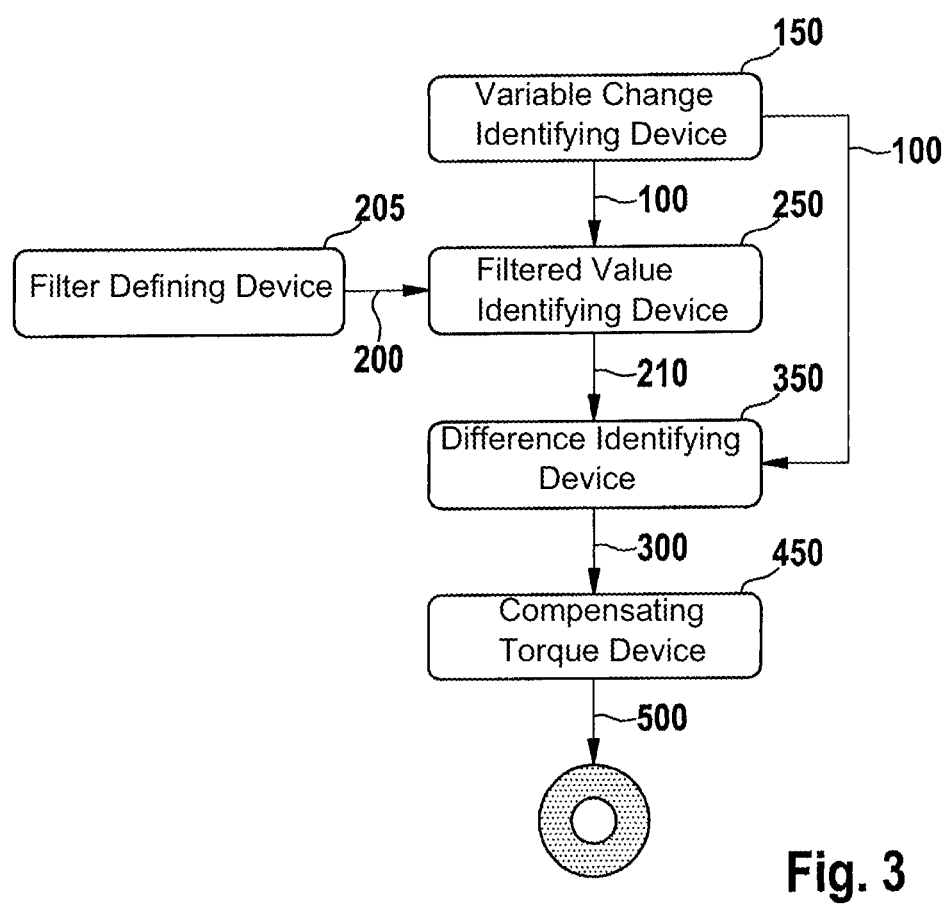
FIG. 3 is a functional diagram of an apparatus according to the present invention.

FIG. 3 is a functional diagram of an apparatus according to the present invention. The apparatus for compensating for the longitudinal deceleration in a motor vehicle brought about by a braking intervention of an electronic stability program (ESP) has a device 150 for identifying the change in longitudinal dynamics variables 100 brought about by the braking intervention. The apparatus furthermore has a device 205 for defining a filter 200 for filtering the identified value 100 of the change in longitudinal dynamics variables, a device 250 for identifying a filtered value 210 of the change in longitudinal dynamics variables using the defined filter 200, and a device 350 for identifying the difference 300 between the identified raw value 100 of the change in longitudinal dynamics variables and the filtered value 210 of the change in longitudinal dynamics variables, as well as a device 450 for making available a compensating engine torque 500. Devices 150, 250, 350, 450 are connected to one another in terms of signal technology in such a way that the longitudinal deceleration 100 brought about by a braking intervention of an electronic stability program (ESP) can be compensated for at least in part by the compensating engine torque 500.

What is claimed is:

1. A method for temporarily compensating for a longitudinal deceleration in a motor vehicle brought about by a braking intervention of an electronic stability program, comprising:
identifying a raw value of change in at least one longitudinal dynamics variable brought about by the braking intervention;
defining a filter to filter the identified raw value of change in the at least one longitudinal dynamics variable;
filtering the identified raw value of change in the at least one longitudinal dynamics variable using the defined filter, in order to obtain a filtered value of the change in the at least one longitudinal dynamics variable;
identifying a difference value between the identified raw value and the filtered value of the change in the at least one longitudinal dynamics variable; and
modifying, as a function of the identified difference value, an engine torque which is requested by a driver of the motor vehicle and acting on drive wheels of the motor vehicle, in order to obtain a compensating engine torque.

2. The method as recited in claim 1, wherein the raw value of change in the at least one longitudinal dynamics variable is at least one of a change in longitudinal force and a change in longitudinal deceleration.

3. The method as recited in claim 2, wherein the modification of the engine torque in order to obtain the compensating engine torque is in an amount equal to the identified difference value.

4. The method as recited in claim 3, wherein the filter is defined as a function of the engine torque requested by the driver at a point in time at which braking is effective.

5. The method as recited in claim 4, wherein the filter is a low-pass filter.

6. The method as recited in claim 5, wherein the filter has a threshold value which is defined as a function of the engine torque requested by the driver at the point in time at which braking is effective.

7. The method as recited in claim 6, wherein an adaptation of at least one of the filter and the threshold value occurs upon a change in the engine torque requested by the driver of the motor vehicle, at a point in time of compensation, in order to obtain the compensating engine torque adapted in a direction of the change in engine torque desired by the driver.

8. The method as recited in claim 7, wherein the compensating engine torque is identified in consideration of a gear ratio present at the point in time of compensation.

* * * * *